United States Patent
Jeong et al.

(10) Patent No.: US 12,227,602 B2
(45) Date of Patent: Feb. 18, 2025

(54) POLYPROPYLENE RESIN HAVING EXCELLENT MELT CHARACTERISTICS, AND PREPARATION METHOD THEREFOR

(71) Applicant: LOTTE CHEMICAL CORPORATION, Seoul (KR)

(72) Inventors: Su-Jeong Jeong, Daejeon (KR); Hyun-Yul Woo, Daejeon (KR); Joon-Keun Min, Daejeon (KR); Rai-Ha Lee, Suwon-si (KR); Eun-Hye Shin, Daejeon (KR); Byung-Hun Chae, Daejeon (KR)

(73) Assignee: LOTTE CHEMICAL CORPORATION, Seoul (KR)

( * ) Notice: Subject to any disclaimer, the term of this patent is extended or adjusted under 35 U.S.C. 154(b) by 825 days.

(21) Appl. No.: 17/296,936

(22) PCT Filed: Nov. 27, 2019

(86) PCT No.: PCT/KR2019/016478
§ 371 (c)(1),
(2) Date: May 25, 2021

(87) PCT Pub. No.: WO2020/111777
PCT Pub. Date: Jun. 4, 2020

(65) Prior Publication Data
US 2022/0025083 A1  Jan. 27, 2022

(30) Foreign Application Priority Data
Nov. 29, 2018 (KR) .......... 10-2018-0150791

(51) Int. Cl.
*C08F 210/06* (2006.01)

(52) U.S. Cl.
CPC ........ *C08F 210/06* (2013.01); *C08F 2420/00* (2013.01); *C08F 2800/20* (2013.01)

(58) Field of Classification Search
CPC .. C08F 210/06; C08F 2420/00; C08F 110/06; C08F 2500/09
See application file for complete search history.

(56) References Cited

U.S. PATENT DOCUMENTS

| 4,525,257 A | 6/1985 | Kurtz et al. |
| 4,752,597 A | 6/1988 | Turner |

(Continued)

FOREIGN PATENT DOCUMENTS

| EP | 0 686 649 A1 | 12/1995 |
| JP | H9-510253 | 10/1997 |

(Continued)

OTHER PUBLICATIONS

International Search Report for corresponding International Application No. PCT/KR2019/016478, dated Mar. 4, 2020, 8pp.

(Continued)

*Primary Examiner* — Catherine S Branch
(74) *Attorney, Agent, or Firm* — Womble Bond Dickinson (US) LLP (57) ABSTRACT

The present invention relates to a high-melt-strength polypropylene resin, and a preparation method therefor. A method for preparing the high-melt-strength polypropylene resin, according to the present invention, comprises the steps of: creating a polypropylene by polymerizing propylene monomers in the presence of a metallocene catalyst; and putting a diene compound and a comonomer into the created (Continued)

polypropylene and unreacted propylene monomers and reacting same, thereby forming a C40 or greater long-chain branch on the main chain of the polypropylene.

7 Claims, 1 Drawing Sheet

(56) References Cited

U.S. PATENT DOCUMENTS

| | | | |
|---|---|---|---|
| 5,368,919 | A | 11/1994 | Robeson |
| 5,414,027 | A | 5/1995 | DeNicola, Jr. et al. |
| 5,416,169 | A | 5/1995 | Saito et al. |
| 5,541,236 | A | 7/1996 | DeNicola, Jr. et al. |
| 5,554,668 | A | 9/1996 | Scheve et al. |
| 5,591,785 | A | 1/1997 | Scheve et al. |
| 5,688,734 | A * | 11/1997 | Speca .................... C08F 10/00 526/904 |
| 5,731,362 | A | 3/1998 | Scheve et al. |
| 5,756,587 | A | 5/1998 | Bettonville et al. |
| 6,462,161 | B1 | 10/2002 | Cady et al. |
| 7,531,605 | B2 | 5/2009 | Machida et al. |
| 2004/0054098 | A1 | 3/2004 | Weng et al. |
| 2009/0264606 | A1 | 10/2009 | Ernst et al. |
| 2011/0306739 | A1 | 12/2011 | Carpentier et al. |
| 2015/0175789 | A1 | 6/2015 | Klimke et al. |
| 2018/0051160 | A1 | 2/2018 | Pehlert et al. |
| 2018/0142045 | A1 | 5/2018 | Luo |
| 2019/0119427 | A1 | 4/2019 | Chae et al. |

FOREIGN PATENT DOCUMENTS

| | | |
|---|---|---|
| JP | 2001-172465 A | 6/2001 |
| JP | 4326802 B2 | 9/2009 |
| KR | 2000-0011087 A | 2/2000 |
| KR | 10-2004-0054596 A | 6/2004 |
| KR | 10-2006-0039980 A | 5/2006 |
| KR | 10-0695336 B1 | 3/2007 |
| KR | 10-2009-0083488 A | 8/2009 |
| KR | 10-2011-0084303 A | 7/2011 |
| KR | 10-2015-0023772 A | 3/2015 |
| KR | 10-2017-0115199 A | 10/2017 |
| KR | 10-2017-0126104 A | 11/2017 |
| KR | 10-2018-0034729 A | 4/2018 |
| WO | WO 97/49759 A1 | 12/1997 |
| WO | WO 98/34971 A1 | 8/1998 |
| WO | WO 2017/176074 A1 | 10/2017 |

OTHER PUBLICATIONS

Extended European Search Report dated Jul. 19, 2022 issued in corresponding Application No. 19889955.1, 6 pages.
Japanese Office action dated Aug. 12, 2022 issued in corresponding JP Application No. 2021-530783, 5 pages.

* cited by examiner

POLYPROPYLENE RESIN HAVING EXCELLENT MELT CHARACTERISTICS, AND PREPARATION METHOD THEREFOR

CROSS-REFERENCE TO RELATED APPLICATIONS

This application is a U.S. National Phase Patent Application of International Application Number PCT/KR2019/016478, filed on Nov. 27, 2019, which claims priority to Korean Patent Application Number 10-2018-0150791, filed on Nov. 29, 2018, the entire content of both of which is incorporated herein by reference.

TECHNICAL FIELD

The present disclosure relates to a high-melt-strength polypropylene resin and a method of producing the same, and more particularly, to a method of producing a high-melt-strength polypropylene resin using a metallocene catalyst, and a polypropylene resin thereof.

BACKGROUND ART

In order to apply polypropylene (PP) to molding processes such as foaming, thermoforming, extrusion coating, blow molding, and the like, the melting properties of a melt are important. In order to modify the melting properties, adding a long-chain branch (LCB) to the main chain of PP is known as an effective method to efficiently improve the melt strength.

For example, the production of high-melt-strength polypropylene (HMSPP) is obtained through the introduction of a long side-chain branch of a polymer chain, and the following various methods to introduce a long side-chain branch are known.

For example, U.S. Pat. Nos. 5,368,919, 5,414,027, 5,541,236, 5,554,668, 5,591,785 and 5,731,362 disclose polypropylene polymers having high melt strength using an electron beam irradiation device. Although the polypropylene polymers obtained according to these patents have excellent performance, it requires the installation of electron beam irradiation equipment, and thus, there is a problem in that the operation costs may be high and the production cost of high melt strength polypropylene is high due to low productivity.

In addition, U.S. Pat. Nos. 5,416,169 and 4,525,257, and WO1997/049759 disclose a method for preparing high-melt-strength polypropylene using an organic peroxide, and introduce long chains into polypropylene through reaction with polypropylene under certain reaction conditions. However, there is a disadvantage of having to undergo an action extrusion process along with a residual problem due to the use of peroxide, a polypropylene decomposition problem, a yellowing problem, and the like.

In addition, Korean Patent Application Publication No. 2011-0084303 discloses a method of using two types of catalysts, but there is an uneconomic problem in terms of facilities and manufacturing costs because a two-step reaction is performed.

Furthermore, Korean Patent Application Publication No. 2016-0122941 discloses a method for producing high-melt strength polypropylene using one type of metallocene catalyst and a diene monomer. However, there is a problem that the melt elongation is short compared to the increase of the melt strength, and a certain amount of gel is generated.

DISCLOSURE

Technical Problem

An aspect of the present disclosure is to provide a method of producing a polypropylene that may control the structure of a long-chain branch in a polypropylene main chain and has excellent melt strength and melt elongation.

In addition, an aspect of the present disclosure is to provide a polypropylene resin having an improved melt strength to an optimum level while maintaining a gel content of 1% by weight or less.

Technical Solution

According to an aspect of the present disclosure, a method of producing a high-melt-strength polypropylene resin is provided. The method includes producing a polypropylene by polymerizing a propylene monomer in the presence of a metallocene catalyst; and forming a long-chain branch in a main chain of the polypropylene by adding and reacting a diene compound and a comonomer to the produced polypropylene and an unreacted propylene monomer.

The diene compound may be at least one selected from aliphatic diene compounds and aromatic diene compounds of ($C_4$ to $C_{20}$), and the diene compound may be added in an amount of 0.0001 to 5 parts by weight based on 100 parts by weight of the propylene monomer.

The comonomer may be at least one selected from olefins consisting of ethene, propene, 1-butene, 1-pentene, 1-hexene, 1-heptene, 1-octene, 1-nonene, 1-decene, 1-undecene and 1-dodecene, and the comonomer may be added within a range of 0.1 to 20 parts by weight based on the propylene monomer.

The producing a polypropylene may be carried out in a first reactor, and the forming a long-chain branch in a polypropylene main chain may be carried out in a second reactor.

The method may further include prepolymerizing the propylene monomer before the producing the polypropylene.

The metallocene catalyst may include at least one of transition metal compounds represented by Formula 1 and Formula 2 below.

Formula 1

Formula 2

In Formula 1 and Formula 2,
$M^1$ and $M^2$ are each independently an element of Group 3 to 10 on the periodic table,
$X^1$ and $X^2$ each may independently be a ($C_1$-$C_{20}$) alkyl group, a ($C_3$-$C_{20}$) cycloalkyl group, a ($C_1$-$C_{20}$) alkylsilyl group, a silyl ($C_1$-$C_{20}$) alkyl group; a ($C_6$-$C_{20}$) aryl group, a ($C_6$-$C_{20}$) aryl ($C_1$-$C_{20}$) alkyl group, a ($C_1$-$C_{20}$) alkyl ($C_6$-$C_{20}$) aryl group, a ($C_6$-$C_{20}$) arylsilyl group, a silyl ($C_6$-$C_{20}$) aryl group; a ($C_1$-$C_{20}$) alkoxy group, a ($C_1$-$C_{20}$) alkylsiloxy group; a ($C_6$-$C_{20}$) aryloxy group; a halogen group; or an amine group, Ar¹ and Ar², and Ar³ and Ar⁴, are the same or different from each other, and each may independently be a ligand having a skeleton of any one of cyclopentadienyl, methylcyclopentadienyl, dimethylcyclopentathienyl and indenyl, m and n are each independently an integer of 1 to 5, B is selected from carbon, silicon, germanium, nitrogen and phosphorus, L is hydrogen, a ($C_1$-$C_{20}$) alkyl group, a cyclo ($C_1$-$C_{20}$) alkyl group, a ($C_1$-$C_{20}$) alkylsilyl group, a silyl ($C_1$-$C_{20}$) alkyl group, a ($C_6$-$C_{20}$) aryl group, a ($C_6$-$C_{20}$)aryl ($C_1$-$C_{20}$)alkyl group, a ($C_1$-$C_{20}$)alkyl($C_6$-$C_{20}$)aryl group, a ($C_6$-$C_{20}$) arylsilyl group, or a silyl($C_6$-$C_{20}$)aryl group, and p is an integer of 1 or 2.

In addition, the metallocene catalyst may further include at least one of compounds represented by Formulas 3 to 5, as a cocatalyst.

$$—[Al(Ra)—O]_n— \qquad \text{Formula 3}$$

In Formula 3 above, Al is aluminum, O is oxygen, Ra is a halogen group, or a ($C_1$-$C_{20}$) hydrocarbyl group unsubstituted or substituted with a halogen group, and n is an integer of 2 or more.

$$Q(Rb)_3 \qquad \text{Formula 4}$$

In Formula 4 above, Q is aluminum or boron, and each Rb is the same as or different from to others thereof, and each thereof is independently a halogen group or a ($C_1$-$C_{20}$) hydrocarbyl group unsubstituted or substituted with a halogen group.

$$[W]^+[Z(Rc)_4]^- \qquad \text{Formula 5}$$

In Formula 5 above, $[W]^+$ is a cationic Lewis acid, or a cationic Lewis acid to which a hydrogen atom is bonded, Z is a group 13 element, each Rc is the same as or different from to others thereof, and each thereof is independently a ($C_6$-$C_{20}$)aryl group substituted with 1 or 2 or more substituents selected from the group consisting of a halogen group, a ($C_1$-$C_{20}$)hydrocarbyl group, an alkoxy group, and a phenoxy group; and a ($C_1$-$C_{20}$) alkyl group substituted with 1 or 2 or more substituents selected from the group consisting of a halogen group, a ($C_1$-$C_{20}$) hydrocarbyl group, an alkoxy group and a phenoxy group.

According to an aspect of the present disclosure, a high-melt-strength polypropylene resin is provided. The resin is produced by the method above, includes a residue of a diene compound in an amount of 0.0001 to 5% by weight, and has a gel content of 1% by weight or less.

The polypropylene resin may have a melt elongation rate in which a melt index (230° C., 2.16 kg load) is 0.1 to 50 g/10 min, a melt strength (Extensional viscosity fixture in the advanced rheometric expansion system (ARES), 190° C., Extension Rate of 0.1 s⁻¹) is 1 to 30 gf, and a maximum melt elongation time is 20 seconds or more.

Advantageous Effects

According to the method in an exemplary embodiment of the present disclosure, the structure of a long-chain branch in a polypropylene main chain may be controlled, compared to the related art process.

By the method of the present disclosure, a polypropylene having excellent melt strength and melt elongation may be prepared while maintaining the gel content of 1% by weight or less.

Further, the polypropylene as described above has excellent processability, and thus, an extruded product having an attractive surface may be obtained by extrusion.

BEST MODE FOR INVENTION

According to an exemplary embodiment of the present disclosure, there is provided a method of preparing a diene-modified polypropylene resin by forming a long-chain branch in a polypropylene main chain.

In the method according to the exemplary embodiment, polypropylene is polymerized by introducing a propylene monomer into a reactor under a metallocene catalyst, and then a diene compound and a comonomer are further added and reacted, thereby obtaining a propylene in which a long-chain branch is formed in the polypropylene main chain, to have excellent melt strength. With the polypropylene resin obtained accordingly, a molded article having an attractive surface while having excellent workability may be manufactured.

The polymerization reaction of the long-chain branched polypropylene may be carried out by introducing a propylene monomer, a comonomer, and a diene compound into a reactor in the presence of a catalyst to react.

As the catalyst, a metallocene catalyst is used. As the metallocene catalyst, it may be preferable to use a catalyst including at least one transition metal compound of Formulas 1 and 2 below.

Formula 1

In Formula 1 above, Ar¹ and Ar² may be the same as or different from each other and each may independently be a ligand having a skeleton of any one of cyclopentadienyl, methylcyclopentadienyl, dimethylcyclopentathienyl and indenyl.

In Formula 1 above, M¹ is an element of Group 3 to 10 on the periodic table.

In Formula 1, X¹ is a ($C_1$-$C_{20}$) alkyl group, a ($C_3$-$C_{20}$) cycloalkyl group, a ($C_1$-$C_{20}$) alkylsilyl group, a silyl ($C_1$-$C_{20}$) alkyl group; a ($C_6$-$C_{20}$) aryl group, a ($C_6$-$C_{20}$) aryl ($C_1$-$C_{20}$) alkyl group, a ($C_1$-$C_{20}$) alkyl ($C_6$-$C_{20}$) aryl group, a ($C_6$-$C_{20}$) arylsilyl group, a silyl ($C_6$-$C_{20}$) aryl group; (a $C_1$-$C_{20}$) alkoxy group, a ($C_1$-$C_{20}$) alkylsiloxy group; a ($C_6$-$C_{20}$) aryloxy group; a halogen group; or an amine group.

Furthermore, in Formula 1, m is an integer of 1 to 5.

Formula 2

In Formula 2 above, $Ar^3$ and $Ar^4$ may be the same as or different from each other and each may independently be a ligand having a skeleton of any one of cyclopentadienyl, methylcyclopentadienyl, dimethylcyclopentathienyl and indenyl.

In Formula 2, $M^2$ is an element of Group 3 to 10 on the periodic table.

In Formula 2, $X^2$ is a $(C_1\text{-}C_{20})$ alkyl group, $(C_3\text{-}C_{20})$ cycloalkyl group, $(C_1\text{-}C_{20})$ alkylsilyl group, silyl $(C_1\text{-}C_{20})$ alkyl group; a $(C_6\text{-}C_{20})$ aryl group, $(C_6\text{-}C_{20})$aryl$(C_1\text{-}C_{20})$ alkyl group, $(C_1\text{-}C_{20})$alkyl$(C_6\text{-}C_{20})$ aryl group, $(C_6\text{-}C_{20})$ arylsilyl group, silyl $(C_6\text{-}C_{20})$ aryl group; a $(C_1\text{-}C_{20})$ alkoxy group, $(C_1\text{-}C_{20})$ alkylsiloxy group; a $(C_6\text{-}C_{20})$ aryloxy group; a halogen group; or an amine group.

In Formula 2, n is an integer of 1 to 5.

In Formula 2, B is selected from carbon, silicon, germanium, nitrogen and phosphorus.

In Formula 2, L is hydrogen, a $(C_1\text{-}C_{20})$ alkyl group, cyclo $(C_3\text{-}C_{20})$ alkyl group, $(C_1\text{-}C_{20})$ alkylsilyl group, silyl $(C_1\text{-}C_{20})$ alkyl group, $(C_6\text{-}C_{20})$ aryl group, $(C_6\text{-}C_{20})$aryl$(C_1\text{-}C_{20})$ alkyl group, $(C_1\text{-}C_{20})$alkyl$(C_6\text{-}C_{20})$ aryl group, $(C_6\text{-}C_{20})$ arylsilyl group or silyl$(C_6\text{-}C_{20})$ aryl group.

Furthermore, in Formula 2, n is an integer of 1 or 2.

The term "alkyl" described in the present disclosure refers to a monovalent straight or branched saturated hydrocarbon radical composed of only carbon and hydrogen atoms. Examples of such alkyl radicals include methyl, ethyl, propyl, isopropyl, butyl, isobutyl, t-butyl, pentyl, hexyl, octyl, dodecyl, and the like, but are not limited thereto.

In addition, the term "cycloalkyl" described in the present disclosure refers to a monovalent alicyclic alkyl radical composed of one ring, and examples of cycloalkyl include cyclopropyl, cyclobutyl, cyclopentyl, cyclohexyl, cycloheptyl, cyclooctyl, cyclononyl, cyclodecyl, and the like, but are not limited thereto.

In addition, the term "alkenyl" described in the present disclosure refers to a straight or branched hydrocarbon radical containing one or more carbon-carbon double bonds, and examples of alkenyl include ethenyl, propenyl, butenyl, pentenyl, and the like, but are not limited thereto.

In addition, the term "aryl" described in the present disclosure is an organic radical derived from an aromatic hydrocarbon by removing one hydrogen, and an example of aryl includes a single or fused ring system. Detailed examples thereof include, but are not limited to, phenyl, naphthyl, biphenyl, anthryl, fluorenyl, phenanthryl, triphenylenyl, pyrenyl, peryleneyl, chrysenyl, naphthacenyl, fluoranthenyl, and the like.

In addition, the term "alkoxy" described in the present disclosure refers to an —O-alkyl radical, where "alkyl" is as defined above. Examples of such alkoxy radicals include, but are not limited to, methoxy, ethoxy, isopropoxy, butoxy, isobutoxy, t-butoxy, and the like.

In addition, the term "aryloxy" described in the present disclosure refers to an —O-aryl radical, where "aryl" is as defined above. Examples of such aryloxy radicals include, but are not limited to, phenoxy, biphenoxy, naphthoxy, and the like.

In addition, the term "halogen" described in the present disclosure refers to a fluorine, chlorine, bromine or iodine atom.

In the case of the transition metal compound in the present disclosure, by the transition metal compound as represented by Formula 1 or 2, a polypropylene resin in which high melt strength and molecular weight and uniform composition distribution may be obtained, and the long-chain branch structure may be controlled, due to excellent catalytic activity and copolymerization, may be produced.

In an embodiment of the present disclosure, the transition metal compound may be selected from compounds having the following structures, but is not limited thereto.

-continued

In the compounds of the above structures, Cp is indenyl, cyclopentadienyl, methylcyclopentadienyl, dimethylcyclopentathienyl, diisopropylcyclopentadienyl, trimethylcyclopentadienyl or tetramethylcyclopentadienyl, and; $M^1$ is tetravalent titanium, zirconium or hafnium; $X^1$ is chloro, fluoro, bromo, methyl, ethyl, propyl, butyl, pentyl, methoxy, ethoxy, propoxy, butoxy or dimethylamino.

Meanwhile, in order for the transition metal compound of Formula 1 or 2 to become an active catalyst component used in polypropylene polymerization, while cationizing the central metal by extracting the ligand in the transition metal compound, a counter ion having weak binding power, for example, a compound represented by Formulas 3 to 5, which may act as an anion, acts together as a cocatalyst.

$$—[Al(Ra)—O]_n—  \quad \text{Formula 3}$$

In Formula 3, Al is aluminum, Ra is a halogen group or a $(C_1-C_{20})$ hydrocarbyl group unsubstituted or substituted with a halogen group, O is oxygen, and n is an integer of 2 or more.

$$Q(Rb)_3 \quad \text{Formula 4}$$

In Formula 4, Q is aluminum or boron, each Rb is the same as or different from to others thereof and each thereof is independently a halogen group or a $(C_1-C_{20})$hydrocarbyl group unsubstituted or substituted with a halogen group.

$$[W]^+[Z(Rc)_4]^- \quad \text{Formula 5}$$

In Formula 5, $[W]^+$ is a cationic Lewis acid or a cationic Lewis acid bonded with a hydrogen atom, Z is a Group 13 element, each Rc is the same as or different from to others thereof and each thereof may independently be a $(C_6-C_{20})$ aryl group substituted with 1 or 2 or more substituents selected from the group consisting of a halogen group, a $(C_1-C_{20})$ hydrocarbyl group, an alkoxy group, and a phenoxy group; or a $(C_1-C_{20})$alkyl group substituted with 1 or 2 or more substituents selected from the group consisting of a halogen group, a $(C_1-C_{20})$hydrocarbyl group, an alkoxy group, and a phenoxy group.

The cocatalyst compound is included in the catalyst composition together with the transition metal compound represented by Formula 1 or 2 to activate the transition metal compound. In detail, in order for the transition metal compound to become an active catalyst component used in olefin polymerization, a ligand in the transition metal compound is extracted to cationize the central metal (M), and a compound comprising a unit represented by Formula 3, a compound represented by Formula 4, and a compound represented by Formula 5, which are capable of acting as a counterion having weak binding power, that is, an anion, act together as cocatalysts.

The 'unit' represented by Formula 3 is a structure in which n structures in [ ] are connected in the compound, and as long as the unit represented by Formula 3 is included, other structures in the compound are not particularly limited, and the compound may be a cluster type, for example, a spherical compound in which the repeated units of Formula 3 are connected to each other.

The compound containing the unit represented by Formula 3 is not particularly limited, and may be preferably an alkylaluminoxane. Non-limiting examples thereof may include methylaluminoxane, ethylaluminoxane, isobutylaluminoxane, butylaluminoxane, and the like. In consideration of the activity of the transition metal compound, methylaluminoxane may be preferably used.

In addition, the compound represented by Formula 4 is an alkyl metal compound and is not particularly limited, and non-limiting examples thereof may include trimethyl aluminum, triethyl aluminum, triisobutyl aluminum, tripropyl aluminum, tributyl aluminum, dimethyl chloro aluminum, tri isopropyl aluminum, tri-s-butyl aluminum, tricyclopentyl aluminum, tripentyl aluminum, triisopentyl aluminum, trihexyl aluminum, trioctyl aluminum, ethyldimethyl aluminum, methyldiethyl aluminum, triphenyl aluminum, tri-p-tolyl aluminum, dimethyl aluminum methoxide, dimethyl aluminum ethoxide, trimethyl boron, triethyl boron, triisobutyl boron, tripropyl boron, tributyl boron, and the like. In consideration of the activity of the transition metal compound, one or two or more selected from the group consisting of trimethyl aluminum, triethyl aluminum and triisobutyl aluminum may be preferably used.

When considering the activity of the transition metal compound, the compound represented by Formula 5 may be a dimethylanilinium cation when the $[W]^+$ is a cationic Lewis acid to which a hydrogen atom is bonded, and may be $[(C_6H_5)_3C]^+$ when $[W]^+$ is a cationic Lewis acid, and the $[Z(Rc)_4]^-$ may preferably be $[B(C_6F_5)_4]^-$.

The compound represented by Formula 5 is not particularly limited, but non-limiting examples thereof in the case in which [W]⁺ is a cationic Lewis acid bonded with a hydrogen atom include triethylammonium tetrakisphenylborate, tributylammonium tetrakisphenylborate, trimethyl ammonium tetrakisphenylborate, tripropylammonium tetrakisphenylborate, trimethylammonium tetrakis(p-tolyl)borate, tripropylammonium tetrakis(p-tolyl)borate, trimethylammonium tetrakis(o,p-dimethylphenyl)borate, triethylammonium tetrakis (o,p-dimethylphenyl)borate, tributylammonium tetrakis (p-trifluoromethylphenyl)borate, trimethylammonium tetrakis (p-trifluoromethylphenyl) borate, tributylammonium tetrakispentafluorophenylborate, anilinium tetrakisphenylborate, anilinium tetrakis(pentafluorophenyl) borate, N,N-dimethylanilinium tetrakis(pentafluoro Phenyl) borate, N,N-diethylanilinium tetrakisfetylborate, N,N-diethylanilinium tetrakisphenylborate, N,N-diethylanilinium tetrakispentafluorophenylborate, di ethyl ammonium tetrakispentafluorophenyl borate, triphenylphosphonium tetrakisphenyl borate, trimethylphosphonium tetrakisphenyl borate, triphenylcarbonium tetrakis(p-trifluoromethylphenyl) borate, triphenylcarbonium tetrakispentafluorophenyl borate, dimethylanilinium tetrakis (pentafluorophenyl) borate, and the like.

The amount of the cocatalyst compound added may be determined in consideration of the amount of the transition metal compound represented by Formula 1 or 2 and the amount required to sufficiently activate the cocatalyst compound. The content of the cocatalyst compound may be 1:1 to 100,000, based on the molar ratio of the metal contained in the cocatalyst compound, with respect to 1 mol of the transition metal contained in the transition metal compound represented by Formula 1 or 2, and may be preferably, 1:1 to 10,000, more preferably 1:1 to 5,000.

In more detail, the compound represented by Formula 3 may be preferably included in a molar ratio of 1:10 to 5,000, more preferably 1:50 to 1,000 molar ratio, most preferably, 1:100 to 1,000 molar ratio. If the molar ratio of the compound represented by Formula 3 to the transition metal compound of Formula 1 or 2 is less than 1:10, the amount of aluminoxane is very small, so that the activation of the metal compound may not proceed completely, and if it exceeds 1:5,000, an excessive amount of aluminoxane may act as a catalyst poison such that the polymer chain is prevented from growing well.

In addition, when Q in the cocatalyst compound represented by Formula 4 is boron, boron may be supported in a molar ratio of 1:1 to 100, preferably 1:1 to 10, more preferably 1:1 to 3, with respect to the transition metal compound represented by Formula 1 or 2. In the case in which Q in the cocatalyst compound represented by Formula 4 is aluminum, it may vary depending on the amount of water in the polymerization system, but aluminum may be supported in a molar ratio of 1:1 to 1000, preferably 1:1 to 500, more preferably 1:1 to 100, with respect to the transition metal compound represented by Formula 1 or 2.

In addition, the cocatalyst compound represented by Formula 5 may be supported in a molar ratio of 1:1 to 100, preferably 1:1 to 10, more preferably 1:1 to 4, with respect to the transition metal compound represented by Formula 1 or 2. If the ratio of the cocatalyst compound represented by Formula 5 is less than 1:1, the amount of the activator is relatively small, so that the activation of the metal compound is not completely achieved, and thus there may be a problem in that the activity of the resulting catalyst composition is poor. If it exceeds 1:100, activation of the metal compound is completely achieved, but there may be a problem in that the unit cost of the catalyst composition is not economical or the purity of the resulting polymer is deteriorated due to an excessive amount of the remaining activator.

The catalyst composition presented in the present disclosure exists in a uniform form in the polymerization reactor, and thus, may be applied to a solution polymerization process carried out at a temperature equal to or higher than the melting point of the polymer. However, as disclosed in U.S. Pat. No. 4,752,597, the catalyst composition may be used for slurry polymerization or gas phase polymerization process in the form of a heterogeneous catalyst composition obtained by supporting the transition metal catalyst and the cocatalyst on a porous metal oxide support. Therefore, the catalyst composition of the present disclosure may be used together with an inorganic carrier or an organic polymer carrier, and thus, may be applied to a slurry polymerization or gas phase polymerization process. For example, the transition metal compound and the cocatalyst compound may also be used in a form supported on an inorganic carrier or an organic polymer carrier.

The method of producing a polypropylene resin according to an exemplary embodiment of the present disclosure is prepared by polymerizing a propylene monomer in the presence of the transition metal catalyst composition. In this case, the transition metal catalyst and the cocatalyst component may be separately introduced into the reactor, or respective components may be mixed in advance and introduced into the reactor, and the mixing conditions such as the order of addition, temperature, or concentration are not particularly limited.

The molecular weight of the polypropylene may be adjusted by the introduction of hydrogen. The hydrogen is preferably added in an amount of 0 to 1 mole per 100 moles of the propylene monomer.

Polypropylene polymerization by reaction of the propylene monomer may be performed at a temperature of 40 to 80° C. for 20 to 120 minutes, and in more detail, may be carried out at a temperature of 60 to 80° C.

If necessary, prior to polymerization of the main chain of the polypropylene, prepolymerization may be performed. The prepolymerization may be performed for at least 3 minutes or more, preferably 5 to 30 minutes, after the catalyst is introduced into the reactor and the reaction temperature reaches 5 to 60° C.

In this manner, after prepolymerization of polypropylene or without prepolymerization, polymerization of polypropylene may be performed by raising the temperature of the reactor, thereby obtaining a polypropylene main chain.

In the present disclosure, a diene compound and a comonomer are reacted with the obtained polypropylene main chain and unreacted propylene monomer to form a long-chain branch in the polypropylene main chain and the reacting propylene monomer.

The diene compound may be one or more selected from aliphatic diene and aromatic diene of ($C_4$ to $C_{20}$), and may be a compound selected from the group consisting of 1,4-hexadiene, 1,5-hexadiene, 1,6-heptadiene, 1,7-octadiene, 1,8-nonadiene, 1,9-decadiene, 1,10-undecadiene, 1,11-dodecadiene, 1,8-ethylidene, norbornene, dicyclopentadiene, novonadiene, 4-vinyl-1-cyclohexene, 3-vinyl-1-cyclohexene, 2-vinyl-1-cyclohexene, 1-vinyl-1-cyclohexene, o-divinylbenzene, p-divinylbenzene and m-divinylbenzene, which may be used alone or in combination of two or more.

In this case, the diene compound is preferably added in an amount of 0.0001 to 5 parts by weight based on 100 parts by weight of the propylene monomer. If it is out of the above content, it may exhibit undesirable properties in terms of improving the melt strength. For example, if a diene compound is used in an amount less than the above range, the melt strength is not sufficiently expressed, and if a diene compound is used in an excessive amount beyond the above range, a large amount of gel may be generated.

The comonomer may be one or more selected from olefins of ethene, propene, 1-butene, 1-pentene, 1-hexene, 1-heptene, 1-octene, 1-nonene, 1-decene, 1-undecene, and 1-dodecene.

In this case, the comonomer is preferably added in an amount of 0.1 to 20 parts by weight based on 100 parts by weight of the propylene monomer. If the content of the comonomer is less than the above range, there is no improvement in processability, and if used in an excessive amount beyond the above range, undesirable changes in physical properties may occur.

The polymerization of the polypropylene main chain and the formation of long-chain branches by reaction of the diene compound may be performed in the same reactor, but it is more preferable to perform in different reactors.

In detail, if necessary, polymerization of the polypropylene main chain is performed in a first reactor including a prepolymerization unit for prepolymerization, and the polypropylene and unreacted material produced thereby are supplied to a second reactor, and diene and a comonomer may be added to the second reactor to form long-chain branches in the polypropylene main chain. For example, in an exemplary embodiment of the present disclosure, it may be preferable to perform a two-stage reaction process using two continuous reactors. In this case, the first and second reactors are not limited to physically different reactors, and even when the same reactor is used, the reaction conditions and the like may be substantially different.

In this case, the first reactor and the second reactor may be a batch type reactor, and may also be a continuous reactor such as a loop type.

According to the method of the present disclosure, the structure of long-chain branches in polypropylene may be controlled, and polypropylene having excellent melt strength and melt elongation may be produced. In addition, a polypropylene having melt strength improved to an optimum level may be obtained while maintaining the gel content at 1% by weight or less.

In the polypropylene resin obtained by an exemplary embodiment of the present disclosure, a diene compound may be included in an amount of 0.0001 to 5% by weight, a gel content may be 1% by weight or less, a weight average molecular weight (Mw) may be 100,000 to 3,000,000 g/mol, and a molecular weight distribution (Mw/Mn) may be 2 to 20. Furthermore, the polypropylene resin has a melt index (230° C., 2.16 kg load) of 0.1 to 50 g/10 min, and a melt strength thereof (Extensional viscosity fixture in the advanced rheometric expansion system (ARES), 190° C., Extension Rate of 0.1 $s^{-1}$) has a value of 1 to 30 gf, and a melt elongation rate with a maximum elongational time of 20 seconds or more is provided.

MODE FOR INVENTION

Hereinafter, the present disclosure will be described in detail by way of examples. However, the following examples specifically illustrate one embodiment of the present disclosure, and the present disclosure is not limited thereto.

Preparation of Supported Catalyst

Dimethylsilyl bis(2-methyl-4-butylphenylindenyl)zirconium dichloride (by S-PCI) was used as the transition metal compound.

All synthesis reactions were performed in an inert atmosphere such as nitrogen, argon or the like, and standard Schlenk technology and glove box technology were used.

Toluene was further dried by passing Anhydrous Grade (by Sigma-Aldrich) through an activated Molecular Sieve, 4A or an activated alumina layer, and then used. The cocatalyst, methylaluminoxane (MAO) was used by purchasing a 10% toluene solution (HS-MAO-10%) (by Albemarle), and the calcined silica was used without any further treatment. In addition, the catalyst compounds used in the Examples and Comparative Examples were used without further purification.

Silica (manufacturer: Grace, product name: XPO-2412, 2.0 g) was put in a Schlenk flask (100 ml) in a glove box, and then, 10 ml of anhydrous toluene solution was added thereto.

In this case, about 10.2 ml of methylaluminoxane (10% by weight of methylaluminoxane in toluene, 15 mmol based on Al, manufacturer: Grace) was slowly added dropwise thereto at 10° C., stirred at 0° C. for about 1 hour, and then the temperature was raised to 70° C., stirred for 3 hours, and cooled to 25° C. Thereby, a catalyst compound was obtained.

Separately, the synthesized catalyst compound (100 μmol) was put in another 100 ml Schlenk flask in the glove box, and was taken out of the glove box, and then 10 ml of anhydrous toluene solution was added thereto.

In this case, the solution containing methylaluminoxane was slowly added to the solution containing silica and methylaluminoxane at 10° C., heated to 70° C., stirred for 1 hour, cooled to 25° C., and stirred for about 24 hours.

Then, the resulting reaction product was washed with a sufficient amount of toluene and hexane to remove unreacted aluminum compounds, and then, was dried in vacuum to obtain a supported catalyst.

Example 1

The interior of a stainless steel autoclave with an internal volume of 3 L was completely replaced with nitrogen.

While purging with propylene, 2 mmol of triisobutylaluminum (manufactured by Aldrich), 15 mg of hydrogen, and 500 g of propylene were sequentially added, and then the temperature was raised to 40° C.

0.05 g of the prepared transition metal compound-supported catalyst was stirred together with 3 ml of n-Hexane in a flask, and then injected into the reactor.

After prepolymerization was performed for 5 minutes, the temperature was raised to 70° C., the first polymerization reaction was performed for 30 minutes.

After the first polymerization reaction was performed, 3 ml of diene and 5 g of 1-hexene were injected to perform the second polymerization reaction for 30 minutes.

To terminate the reaction, the temperature was lowered to room temperature, and then excess propylene gas was discharged to obtain a polymer powder. Subsequently, the polymer powder was dried for 12 hours or more while heating at 80° C. in a vacuum oven, to prepare a polypropylene resin.

Table 1 illustrates the amount of reactants, reaction temperature, and reaction conditions thereof.

Examples 2 to 7

A polypropylene resin was prepared in the same manner as in Example 1 by applying the contents and conditions as illustrated in Table 1.

Comparative Example 1

In Example 1, except that 1.5 ml of diene was used and diene was immediately added when the reaction temperature reached 70° C. without distinction between the first polymerization reaction and the second polymerization reaction, a propylene resin was prepared in the same manner as in Example 1.

Table 2 shows the amount of reactants, reaction temperature, and reaction conditions.

Comparative Examples 2 to 6

A polypropylene resin was prepared in the same manner as in Example 1 by applying the contents and conditions as illustrated in Table 2.

weight of the resins passed through the orifice were measured and converted into passing amounts for 10 minutes.

(2) Melt Strength (Extensional Viscosity Fixture (EVF) Melt Strength)

Measurements were made using the Extensional viscosity fixture (EVF) mode of the Advanced rheometric expansion system (ARES). The specimens were manufactured by hot press melting or injection, and were manufactured in a length of 20 mm, a width of 10 mm, and a thickness of 7 mm. The specimen was fixed to the sample holder using rheometric measuring equipment (2KFRTN, by TA Instrument Co.), and then the melt strength was measured by the resistance value applied to the specimen when the sample holder rotates about an axis. The maximum value of the melt strength that changes according to the rotation distance (elongation rate) of the sample holder was measured as the melt strength. At this time, the extension rate, which is the rotation speed of the sample holder, was set to $0.1\ s^{-1}$, and the measurement temperature was 190° C.

TABLE 1

| Division | Propylene content(g) | Hydrogen content(mg) | Diene content(ml) | Comonomer content(g) | Reaction temperature (° C.) | First reaction time (minutes) | Second reaction time (minutes) |
|---|---|---|---|---|---|---|---|
| Example 1 | 500 | 15 | 3 | 10 | 70 | 30 | 30 |
| Example 2 | 500 | 10 | 1.5 | 10 | 70 | 30 | 30 |
| Example 3 | 500 | 10 | 0.75 | 10 | 70 | 30 | 30 |
| Example 4 | 500 | 10 | 1.5 | 10 | 70 | 10 | 10 |
| Example 5 | 500 | 10 | 1.5 | 10 | 70 | 60 | 60 |
| Example 6 | 500 | 10 | 3 | 5 | 70 | 30 | 30 |
| Example 7 | 500 | 10 | 3 | 20 | 70 | 30 | 30 |

TABLE 2

| Division | Propylene content(g) | Hydrogen content(mg) | Diene content(ml) | Comonomer content(g) | Reaction temperature (° C.) | First reaction time (minutes) | Second reaction time (minutes) |
|---|---|---|---|---|---|---|---|
| Comparative Example 1 | 500 | 10 | 1.5 | 10 | 70 | 60 | — |
| Comparative Example 2 | 500 | 10 | 3 | 10 | 70 | 60 | — |
| Comparative Example 3 | 500 | 10 | 1.5 | — | 70 | 60 | — |
| Comparative Example 4 | 500 | 10 | 3 | — | 70 | 60 | — |
| Comparative Example 5 | 500 | 10 | 3 | — | 70 | 30 | 30 |
| Comparative Example 6 | 500 | 10 | 1.5 | — | 70 | 30 | 30 |

Property Evaluation

Physical properties of the polypropylene resins prepared in Examples 1 to 7 and Comparative Examples 1 to 6 were measured in the following manner, and the results are illustrated in Table 3 below, respectively.

(1) Melt Index (MI)

According to ASTM D 1238, the polypropylene resins are heated to 230° C. for 4 min and, respectively, and then passes through the orifice (inner diameter: 2.09 mm, length: 8 mm) for a certain period of time (in minutes) in a state in which a 2.16 kg piston is put in place in the cylinder. The (3) Melt Elongation (Extensional Viscosity Fixture (EVF), Elongation Time)

When measuring the melt strength, the time that the holder to which the sample is fixed rotates about an axis was converted into the elongation distance of the sample, and measured. The extension rate, which is the rotational speed, was measured by setting to $0.1\ s^{-1}$. When the sample was elongated over time, the time when the maximum melt strength value was displayed was measured as the melt elongation rate.

(4) Gel Content

The gel content was measured according to the method of ASTM D2765. The dried product was pulverized, put into xylene, extracted for 12 hours at a boiling point, and the residual amount was measured. At this time, the percentage of the sample remaining after extraction to the weight of the sample before extraction was taken as the gel content.

(5) Weight Average Molecular Weight (Mw) and Molecular Weight Distribution (MWD)

Using a PL210 GPC equipped with PL Mixed-BX2+ preCol, measurements were made in a 1,2,3-trichlorobenzene solvent at a rate of 1.0 mL/min at 135° C., and the molecular weight was corrected using a PL polystyrene standard material.

(6) Melting Point (Tm) Analysis

Measurements were made under the 2nd heating condition at a rate of 10° C./min under a nitrogen atmosphere using a Dupont DSC2910.

(7) Processability

Processability was evaluated by measuring the torque of the extruder, and measured with a torque measuring device (measurement method using a load cell device) installed in the extruder.

TABLE 3

| Division | Melt index [g/10 min] | Melt strength [gf] | Elongation Elongation time (Sec) | Gel content [wt %] | Tm [° C.] | Mw | MWD | Processability (Extruder torque) [N · m] |
|---|---|---|---|---|---|---|---|---|
| Example 1 | 2.5 | 12 | 25 | 1 | 152 | 380k | 4.9 | 36 |
| Example 2 | 2.3 | 12 | 35 | 0.5 | 152 | 400k | 4.7 | 35 |
| Example 3 | 3.5 | 4 | 25 | 0.3 | 152 | 370k | 4.7 | 33 |
| Example 4 | 5.4 | 2.2 | 24 | 0.3 | 152 | 360k | 4.5 | 30 |
| Example 5 | 3.0 | 14 | 30 | 0.6 | 152 | 390k | 4.8 | 35 |
| Example 6 | 2.5 | 12 | 34 | 0.5 | 152 | 390k | 4.7 | 36 |
| Example 7 | 2.4 | 10 | 33 | 0.2 | 150 | 400k | 4.9 | 31 |
| Comparative Example 1 | 0.5 | 7 | 4 | 1.7 | 153 | 480k | 5.0 | 50 |
| Comparative Example 2 | 0.1 | 40 | 14 | 2.3 | 152 | 510k | 4.8 | 55 |
| Comparative Example 3 | 0.35 | 15 | 15 | 1.7 | 152 | 500k | 4.6 | 52 |
| Comparative Example 4 | 0.45 | 10 | 12 | 1.5 | 152 | 480k | 4.9 | 50 |
| Comparative Example 5 | 2.3 | 12 | 34 | 0.3 | 152 | 400k | 4.9 | 43 |
| Comparative Example 6 | 2.6 | 9 | 32 | 0.2 | 151 | 380k | 4.7 | 41 |

Figure 1:
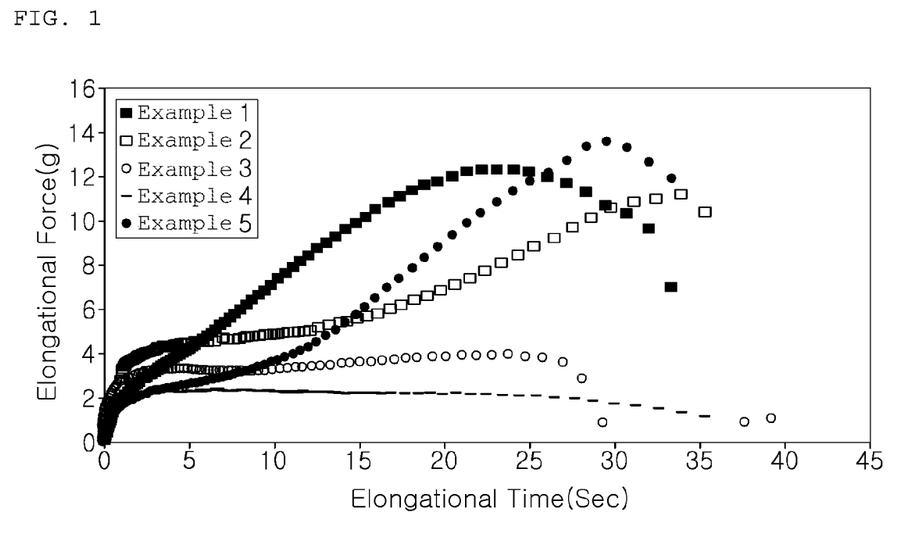
FIG. 1 is a graph illustrating changes in melt strength according to the melt elongational time of polypropylene resins of Examples 1 to 5.
Figure 2:
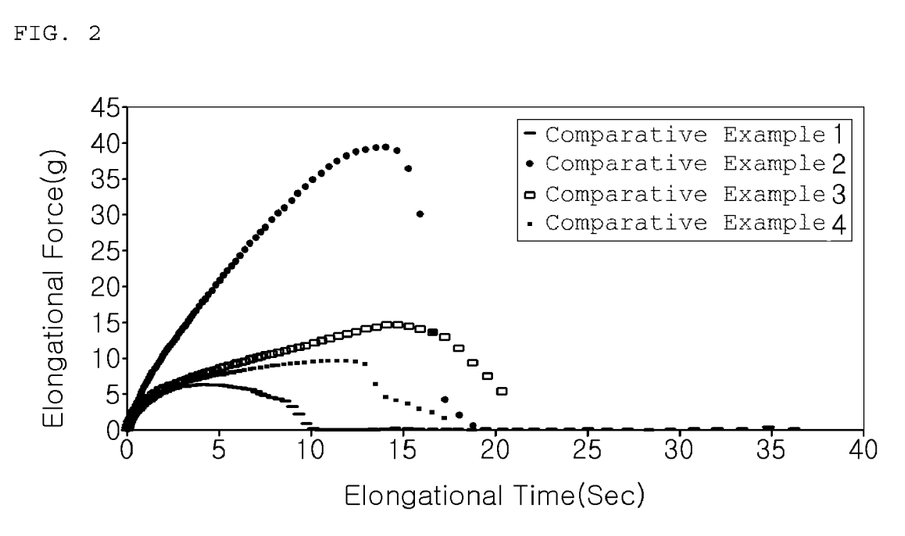
FIG. 2 is a graph illustrating changes in melt strength according to the melt elongational time of polypropylene resins of Comparative Examples 1 to 4.

Referring to Table 3, it can be seen that the polypropylene resins prepared in Examples 1 to 7 according to the method of the present disclosure have excellent catalytic activity, have an appropriate weight average molecular weight and molecular weight distribution, and have superior processability to that of the propylene resins prepared according to Comparative Examples 1 to 6, and have excellent melt elongation while having physical properties suitable for improving the melt strength. For example, according to an exemplary embodiment of the present disclosure, it can be seen that the melt strength may be improved to an optimum level while maintaining the gel content to 1% or less. On the other hand, for the resins of Examples 1 to 5 and Comparative Examples 1 to 4, the change in melt strength according to the melt elongation time is illustrated in FIGS. 1 and 2.

The invention claimed is:

1. A method of producing a high-melt-strength polypropylene resin, comprising following steps:

a) producing a polypropylene by polymerizing a propylene monomer in the presence of a metallocene catalyst; and b) forming a long-chain branch having 40 or more carbon atoms in a main chain of the polypropylene by adding and reacting a diene compound and a comonomer to the produced polypropylene and an unreacted propylene monomer, wherein the diene compound is added in an amount of 0.0001 to 5 parts by weight based on 100 parts by weight of the propylene monomer utilized in the step a), wherein the comonomer is added in an amount of 0.1 to 4 parts by weight based on 100 parts by weight of the propylene monomer utilized in the step a), and wherein the high-melt-strength polypropylene resin has a melt strength of 1 to 30 gf, measured utilizing an extensional viscosity fixture in an advanced rheometric expansion system (ARES) at 190° C. and with an extension rate of 0.1 s$^{-1}$, and a maximum melt elongation time of 20 seconds or more.

2. The method of producing a high-melt-strength polypropylene resin of claim 1, wherein the diene compound is at least one selected from aliphatic diene compounds and aromatic diene compounds of ($C_4$ to $C_{20}$).

3. The method of producing a high-melt-strength polypropylene resin of claim 1, wherein the comonomer is at least one selected from the group consisting of ethene, 1-butene, 1-pentene, 1-hexene, 1-heptene, 1-octene, 1-nonene, 1-decene, 1-undecene and 1-dodecene.

4. The method of producing a high-melt-strength polypropylene resin of claim 1, wherein the producing a polypropylene is carried out in a first reactor, and the forming a long-chain branch in a polypropylene main chain is carried out in a second reactor.

5. The method of producing a high-melt-strength polypropylene resin of claim 1, further comprising prepolymerizing the propylene monomer before the producing the polypropylene, wherein the prepolymerizing is performed at 5 to 60° C. for 5 to 30 minutes, and wherein the step a) is performed at 40 to 80° C. for 20 to 120 minutes.

6. The method of producing a high-melt-strength polypropylene resin of claim 1, wherein the metallocene catalyst comprises at least one transition metal compound of Formula 1 or Formula 2 below:

Formula 1

Formula 2 where in Formula 1 and Formula 2, $M^1$ and $M^2$ are each independently an element of Group 3 to 10 on the periodic table, $X^1$ and $X^2$ are each independently a $(C_1\text{-}C_{20})$ alkyl group, a $(C_3\text{-}C_{20})$ cycloalkyl group, a $(C_1\text{-}C_{20})$ alkylsilyl group, a silyl $(C_1\text{-}C_{20})$ alkyl group; a $(C_6\text{-}C_{20})$ aryl group, a $(C_6\text{-}C_{20})$ aryl $(C_1\text{-}C_{20})$ alkyl group, a $(C_1\text{-}C_{20})$ alkyl $(C_6\text{-}C_{20})$ aryl group, a $(C_6\text{-}C_{20})$ arylsilyl group, a silyl $(C_6\text{-}C_{20})$ aryl group; a $(C_1\text{-}C_{20})$ alkoxy group, a $(C_1\text{-}C_{20})$ alkylsiloxy group; a $(C_6\text{-}C_{20})$ aryloxy group; a halogen group; or an amine group, $Ar^1$ and $Ar^2$, and $Ar^3$ and $Ar^4$, are the same or different from each other, and are each independently a ligand having a skeleton of any one of cyclopentadienyl, methylcyclopentadienyl, dimethylcyclopentathienyl and indenyl, n is an integer of 1 to 5, B is selected from carbon, silicon, germanium, nitrogen and phosphorus, R is hydrogen, a $(C_1\text{-}C_{20})$ alkyl group, a $(C_3\text{-}C_{20})$ cycloalkyl group, a $(C_1\text{-}C_{20})$ alkylsilyl group, a silyl $(C_1\text{-}C_{20})$ alkyl group, a $(C_6\text{-}C_{20})$ aryl group, a $(C_6\text{-}C_{20})$ aryl $(C_1\text{-}C_{20})$ alkyl group, a $(C_1\text{-}C_{20})$ alkyl $(C_6\text{-}C_{20})$ aryl group, a $(C_6\text{-}C_{20})$ arylsilyl group, or a silyl $(C_6\text{-}C_{20})$ aryl group, and m is an integer of 1 or 2.

7. The method of producing a high-melt-strength polypropylene resin of claim 6, wherein the metallocene catalyst further comprises at least one cocatalyst of compounds represented by Formulas 3 to 5:

$$[Al(Ra)\text{—}O]_n\text{—} \qquad \text{Formula 3}$$

where in Formula 3,

Al is aluminum;

Ra is a halogen group, or a $(C_1\text{-}C_{20})$ hydrocarbyl group unsubstituted or substituted with a halogen group, O is oxygen;

n is an integer of 2 or more, $$Q(Rb)_3 \qquad \text{Formula 4}$$

where in Formula 4, Q is aluminum or boron; and each Rb is the same as or different from to others thereof, and each thereof is independently a halogen group or a $(C_1\text{-}C_{20})$ hydrocarbyl group unsubstituted or substituted with a halogen group, $$[W]^+[Z(Rc)_4]^- \qquad \text{Formula 5}$$

where in Formula 5, $[W]^+$ is a cationic Lewis acid, or a cationic Lewis acid to which a hydrogen atom is bonded;

Z is a group 13 element;

each Rc is the same as or different from to others thereof, and each thereof is independently a $(C_6\text{-}C_{20})$ aryl group substituted with 1 or 2 or more substituents selected from the group consisting of a halogen group, a $(C_1\text{-}C_{20})$ hydrocarbyl group, an alkoxy group, and a phenoxy group; and a $(C_1\text{-}C_{20})$ alkyl group substituted with 1 or 2 or more substituents selected from the group consisting of a halogen group, a $(C_1\text{-}C_{20})$ hydrocarbyl group, an alkoxy group and a phenoxy group.

* * * * *